(12) United States Patent
Allo (10) Patent No.: US 11,595,369 B2
(45) Date of Patent: Feb. 28, 2023

(54) PROMOTING SYSTEM AUTHENTICATION TO THE EDGE OF A CLOUD COMPUTING NETWORK

(71) Applicant: Seagate Technology LLC, Cupertino, CA (US)

(72) Inventor: Christopher Nicholas Allo, Lyons, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 647 days.

(21) Appl. No.: 16/677,726

(22) Filed: Nov. 8, 2019

(65) Prior Publication Data

US 2021/0144133 A1    May 13, 2021

(51) Int. Cl.
*H04L 9/40* (2022.01)

(52) U.S. Cl.
CPC ........ *H04L 63/061* (2013.01); *H04L 63/0807* (2013.01); *H04L 63/0853* (2013.01); *H04L 63/20* (2013.01)

(58) Field of Classification Search
CPC ............... H04L 63/061; H04L 63/0807; H04L 63/0853; H04L 63/20
USPC ......................................................... 713/159
See application file for complete search history.

(56) References Cited

U.S. PATENT DOCUMENTS

| | | | |
|---|---|---|---|
| 7,383,433 B2 | 6/2008 | Yeager et al. | |
| 7,392,375 B2 | 6/2008 | Bartram et al. | |
| 7,809,943 B2 | 10/2010 | Seidel | |
| 8,024,784 B1* | 9/2011 | Issa | H04L 63/0281 713/153 |
| 8,560,633 B2 | 10/2013 | Setton et al. | |
| 8,739,292 B2 | 5/2014 | Adler et al. | |
| 8,799,641 B1* | 8/2014 | Seidenberg | H04L 63/0281 713/168 |
| 9,450,944 B1* | 9/2016 | Sousley | H04L 63/0807 |
| 9,509,684 B1* | 11/2016 | Dixson-Boles | H04L 63/083 |
| 9,537,890 B2 | 1/2017 | Ristock et al. | |
| 9,569,176 B2 | 2/2017 | Venkata et al. | |
| 9,817,605 B2* | 11/2017 | Fellner | G06F 16/14 |
| 10,095,635 B2 | 10/2018 | Abbas et al. | |
| 10,154,019 B2 | 12/2018 | McRoberts et al. | |
| 10,673,839 B2* | 6/2020 | Zhang | H04W 12/069 |

(Continued)

OTHER PUBLICATIONS

Xu et al.; Microservice Security Agent Based on API Gateway in Edge Computing; (Year: 2019).*

*Primary Examiner* — Kambiz Zand
*Assistant Examiner* — Mahabub S Ahmed
(74) *Attorney, Agent, or Firm* — Westman, Champlin & Koehler, P.A.

(57) ABSTRACT

Apparatus and method for local authentication of a collection of processing devices, such as but not limited to storage devices (e.g., SSDs, etc.). In some embodiments, an edge computing device is coupled between the collection of processing devices and an external network. The edge computing device performs a network authentication over the external network with a remote server using an edge token. The edge computing device further performs a local authentication of the collection using storage tokens of the respective processing devices, with the local authentication not utilizing the external network or the remote server. Both the edge token and the storage tokens may be generated from a client token of a client device.

20 Claims, 7 Drawing Sheets

(56) References Cited

U.S. PATENT DOCUMENTS

| | | | |
|---|---|---|---|
| 10,742,447 B2* | 8/2020 | Ritchie | H04L 45/507 |
| 11,146,564 B1* | 10/2021 | Ankam | H04L 63/102 |
| 2002/0035685 A1* | 3/2002 | Ono | H04L 9/3268 |
| | | | 713/155 |
| 2003/0235309 A1* | 12/2003 | Struik | H04L 9/0838 |
| | | | 380/278 |
| 2004/0093519 A1* | 5/2004 | Grobman | H04L 63/1458 |
| | | | 726/5 |
| 2005/0021982 A1* | 1/2005 | Popp | G06F 21/34 |
| | | | 713/184 |
| 2005/0100166 A1* | 5/2005 | Smetters | H04L 63/0492 |
| | | | 726/4 |
| 2007/0239730 A1* | 10/2007 | Vigelette | G06F 21/31 |
| 2008/0072303 A1* | 3/2008 | Syed | H04L 63/0807 |
| | | | 726/10 |
| 2010/0169430 A1 | 7/2010 | Ristock et al. | |
| 2011/0162042 A1* | 6/2011 | Xiao | H04L 9/3234 |
| | | | 726/3 |
| 2011/0265172 A1* | 10/2011 | Sharma | H04L 63/0815 |
| | | | 726/8 |
| 2011/0283347 A1* | 11/2011 | Bhuta | H04L 67/561 |
| | | | 726/9 |
| 2011/0296048 A1* | 12/2011 | Knox | H04L 65/765 |
| | | | 709/231 |
| 2012/0096546 A1* | 4/2012 | Dilley | H04L 67/561 |
| | | | 715/236 |
| 2013/0007442 A1* | 1/2013 | Mao | H04L 9/3268 |
| | | | 713/156 |
| 2013/0167211 A1* | 6/2013 | Kamat | H04L 63/08 |
| | | | 726/7 |
| 2013/0222109 A1* | 8/2013 | Lim | G06F 11/006 |
| | | | 340/5.8 |
| 2014/0082353 A1* | 3/2014 | Everhart | H04L 9/3247 |
| | | | 713/158 |
| 2014/0298413 A1* | 10/2014 | Anderson | H04L 63/10 |
| | | | 726/3 |
| 2014/0331046 A1* | 11/2014 | Krishnamurthy | H04L 63/0281 |
| | | | 713/168 |
| 2015/0065093 A1* | 3/2015 | Schmidt | H04W 12/069 |
| | | | 455/411 |
| 2015/0186636 A1* | 7/2015 | Tharappel | G06F 21/32 |
| | | | 726/8 |
| 2016/0036855 A1* | 2/2016 | Gangadharappa | H04L 67/562 |
| | | | 726/1 |
| 2016/0036857 A1* | 2/2016 | Foxhoven | G06F 12/0815 |
| | | | 726/1 |
| 2016/0065563 A1* | 3/2016 | Broadbent | H04L 63/0281 |
| | | | 726/9 |
| 2016/0066183 A1* | 3/2016 | Conant | H04W 12/06 |
| | | | 726/6 |
| 2016/0094539 A1* | 3/2016 | Suresh | H04L 63/0815 |
| | | | 726/7 |
| 2016/0134616 A1* | 5/2016 | Koushik | G06F 21/335 |
| | | | 726/9 |
| 2016/0352720 A1* | 12/2016 | Hu | H04L 67/10 |
| 2017/0019396 A1* | 1/2017 | Bettenburg | G06F 21/42 |
| 2017/0111351 A1* | 4/2017 | Grajek | H04L 63/083 |
| 2017/0289943 A1* | 10/2017 | Zhao | H04W 12/04 |
| 2017/0324749 A1* | 11/2017 | Bhargava | H04L 63/123 |
| 2017/0346804 A1* | 11/2017 | Beecham | H04L 67/56 |
| 2017/0346807 A1* | 11/2017 | Blasi | H04L 9/3247 |
| 2018/0069836 A1* | 3/2018 | Mandyam | H04L 63/0281 |
| 2018/0247654 A1* | 8/2018 | Bhaya | G06F 40/205 |
| 2019/0007409 A1* | 1/2019 | Totale | H04L 63/102 |
| 2019/0014117 A1* | 1/2019 | Li | H04L 67/14 |
| 2019/0042315 A1 | 2/2019 | Smith et al. | |
| 2019/0042319 A1 | 2/2019 | Sood et al. | |
| 2019/0162438 A1* | 5/2019 | Fokou | H04L 67/61 |
| 2020/0036514 A1* | 1/2020 | Christensen | H04L 9/3297 |
| 2020/0074106 A1* | 3/2020 | Narayanaswamy | G06F 21/6227 |
| 2020/0076578 A1* | 3/2020 | Ithal | G06F 21/6227 |
| 2020/0153792 A1* | 5/2020 | Huang | H04L 63/0884 |
| 2020/0169549 A1* | 5/2020 | Smith | H04L 67/141 |
| 2020/0259817 A1* | 8/2020 | Natarajan | H04L 63/0281 |
| 2020/0336322 A1* | 10/2020 | Asanghanwa | H04L 41/5051 |
| 2020/0351274 A1* | 11/2020 | Damour | G06F 21/31 |
| 2022/0166781 A1* | 5/2022 | Hittel | H04L 63/1433 |

\* cited by examiner

EDGE AUTHENTICATION REGISTRY

| DEVICE | INTERNAL | EXTERNAL | REG INFO | SEC POLICY |
|---|---|---|---|---|
| S0 | TOKEN 0 | TOKEN OF S3 | DATECODE 0 | POLICY 0 |
| S1 | TOKEN 1 | TOKEN OF S0 | DATECODE 1 | POLICY 1 |
| S2 | TOKEN 2 | TOKEN OF S5 | DATECODE 2 | POLICY 2 |
| S3 | TOKEN 3 | TOKEN OF S6 | DATECODE 3 | POLICY 3 |
| S4 | TOKEN 4 | TOKEN OF S1 | DATECODE 4 | POLICY 4 |
| S5 | TOKEN 5 | TOKEN OF S4 | DATECODE 5 | POLICY 5 |
| S6 | TOKEN 6 | TOKEN OF S7 | DATECODE 6 | POLICY 6 |
| S7 | TOKEN 7 | TOKEN OF S2 | DATECODE 7 | POLICY 7 |

PROMOTING SYSTEM AUTHENTICATION TO THE EDGE OF A CLOUD COMPUTING NETWORK

SUMMARY

Various embodiments of the present disclosure are generally directed to device authentication systems, such as of the type used in a cloud computing network.

In some embodiments, an edge computing device is coupled between a collection of processing devices and an external network. The edge computing device performs a network authentication over the external network with a remote server using an edge token. The edge computing device further performs a local authentication of the collection using storage tokens of the respective processing devices, with the local authentication not utilizing the external network or the remote server. Both the edge token and the storage tokens may be generated from a client token of a client device.

These and other features which characterize various embodiments of the present disclosure can be understood in view of the following detailed discussion and the accompanying drawings.

DETAILED DESCRIPTION

The present disclosure generally relates to systems and methods for authenticating devices in a distributed data storage environment, such as but not limited to a cloud computing environment.

Cloud computing environments generally operate to store and process data across a geographically distributed network. Network services such as computational resources, software and/or data are made available to various user devices (clients) via a wide area network, such as but not limited to the Internet.

A cloud computing network is generally arranged as an object storage system whereby storage volumes (e.g., files) from the clients are stored in, and replicated to, various storage locations throughout the system in the form of snapshots (copies at a particular point in time). Cloud computing often includes the use of cloud stores (e.g., large scale data centers, etc.) to provide industrial-scale storage and processing resources.

Edge computing refers to a cloud storage strategy where at least certain types of storage and processing resources are distributed throughout the network. Instead of having large data transfers up to main cloud stores which perform most of the data processing, intermediary type devices can interface between the client devices and the main cloud stores to provide more localized processing of data closer to the sources and/or users of the data (hence, "edge" processing). This can reduce the bandwidth requirements on the system and provide better response times and other efficiencies. Edge computing has particular applicability to so-called IoT (Internet of Things) devices, since IoTs tend to generate massive amounts of data. It makes sense to decentralize certain data storage and replication efforts to locations that are logically and/or physically closer to the sources of the data generation activities.

While these and other forms of networked systems have proved to be convenient and efficient, such systems also increasingly require the use of data security schemes to reduce or eliminate unauthorized access to the underlying data collected, stored and processed by such systems. Data security schemes can employ a variety of cryptographic security techniques to protect such systems from third party attacks.

Some systems use a centralized trust-based security protocol to allow a particular host (client) device to gain access to a peripheral device, such as a data storage device. The protocol may involve various steps carried out to respectively authenticate the host, to authenticate the storage device to a remote centralized server (such as a trusted security infrastructure or TSI server), and to authenticate the server to the host and the storage device.

Authentication can be carried out in a variety of ways such as through the use of encrypted challenge values, public and private encryption keys, hashes, digital signatures, biometric inputs, etc. Once the various entities have been mutually verified to each other, a secure operation can be carried out between the host and the peripheral device such as an access to a secured data storage volume, a change in device configuration, etc.

Centralized trust-based security protocols can require significant system resources at both the local device level and the remote server level to track and authenticate the various entities and the requested transactions. This can be time and bandwidth intensive, particularly in edge computing environments where a collection of local devices provide distributed storage and processing capabilities. Centralized security protocols are not always feasible in geographically remote locations where intermittent or non-existent communications can be maintained with remote security server resources, or in systems where there are, at least potentially, a large collection of local devices that require individual authentication.

Various embodiments of the present disclosure are generally directed to an apparatus and method for system authentication in a data processing environment. As explained below, some embodiments provide a collection of local devices, such as data storage devices, that are coupled to a host device, such as an edge computing device that provides edge of cloud processing and transactions with remote cloud servers and other cloud elements.

A registration process is carried out to register various devices to a network for authorized access by a selected user. The registration process may utilize a remote, trusted security server. The devices can include a client device (e.g., a computer, etc.) used by the selected user, an edge processing device and one or more storage devices. Other devices can be included as well. It is contemplated that these devices form a chain of devices that are accessed by the user, including storage and retrieval of user data to and from the storage device(s) at the end of the chain. Each device registration process embeds at least a portion of a client token ("key") supplied by or otherwise generated for the user at the client device.

Once registered, system authentication is carried out by being promoted to the edge device. The edge device authenticates itself to the rest of the upstream network using various authentication information referred to generally as an "edge token", which may include at least a portion of the client token and which is stored at the edge device. The edge device further operates as a local trusted authority to authenticate each of the storage devices. The local authentication of the storage devices uses authentication information referred to generally as "storage tokens," which also may include a least a portion of the client token and are stored by the various storage devices. Once authenticated, system operation commences in a trusted manner.

The process allows the user to be assured that all of the devices with which the user interacts, beginning with the user client device and extending through to the storage devices on which the user data are stored, are authenticated using the client token. Authentication is both demoted down and promoted up to the edge device level, with the edge device acting as a trusted source to authenticate the local storage devices without the need for the local devices to be separately authenticated using a remote server.

The system provides fast and efficient authentication. If the system verifies correctly, there is high trust that the system is authenticated and secure without the need to obtain certificates or other authentication information from a remote authority. The detection of both missing devices and new devices can be handled effectively.

Figure 1:
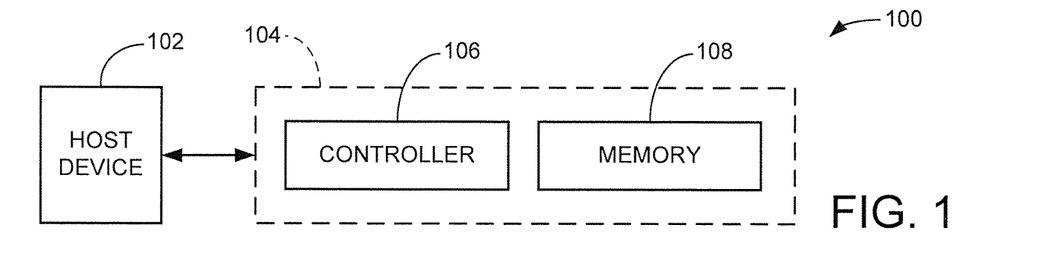
FIG. 1 is a functional block representation of a data processing system which operates in accordance with various embodiments of the present disclosure.

These and other features and advantages of various embodiments can be understood beginning with a review of FIG. 1 which shows a data processing system 100. The data processing system 100 includes a host device 102 operably coupled to a data storage device 104. This is merely exemplary as any number of different types of data processing environments can be used as desired, including environments that do not involve data storage systems.

The host device 102 and the data storage device 104 in FIG. 1 can each take a variety of forms. Without limitation, the host device 102 may take the form of a personal computer, workstation, server, laptop, portable handheld device, smart phone, tablet, gaming console, RAID controller, cloud controller, storage enclosure controller, etc.

The data storage device 104 may be a hard disc drive (HDD), solid-state drive (SSD), hybrid solid state drive (HSSD), thumb drive, optical drive, an integrated memory module, a multi-device storage enclosure, or some other form of device.

The data storage device 104 may be incorporated into the host device as an internal component or may be an external component accessible via a communication pathway with the host device 102 including a cabling connection, a wireless connection, a network connection, etc.

For purposes of the present discussion, it will be contemplated that the host device 102 is a computer and the data storage device 104 provides a main memory store for user data generated by the host device, such as flash memory in a solid state drive (SSD). The SSD may be a single device, or may be grouped together with additional SSDs or other forms of storage device to support a mass storage environment.

Figure 2:
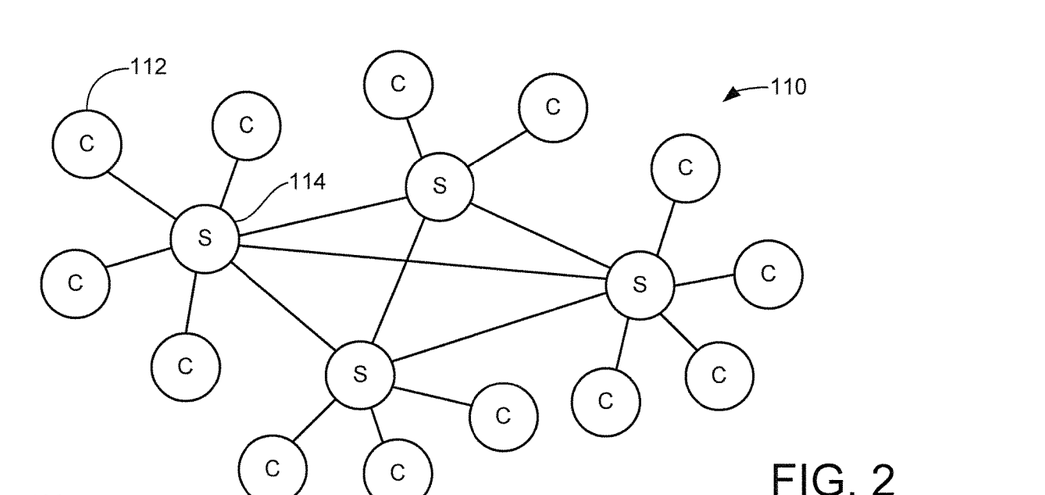
FIG. 2 shows a configuration of a computer network that may employ data processing elements of FIG. 1 in some embodiments.

FIG. 2 shows a distributed computer network 110. The network 110 has a number of interconnected processing nodes including client (C) nodes 112 and server (S) nodes 114. The client nodes may represent local user systems with host computers 102 and one or more storage devices 104 as depicted in FIG. 1. The server nodes may interconnect groups of remotely connected clients. Other arrangements can be used. It will be understood that the authentication processing described herein can be carried out by both server and client nodes.

Generally, any node in the system can communicate directly or indirectly with any other node. The network 110 can be a private network, a public network, a combination of both public and private networks, the Internet, a cloud computing environment, etc. Local collections of devices can be coupled to edge computing devices that provide edge of network processing for larger data handling networks. It is contemplated that the overall network 110 is a low trust environment potentially susceptible to attacks by third parties. Authentication security schemes are implemented to protect against such attacks, as will now be described.

Figure 3:
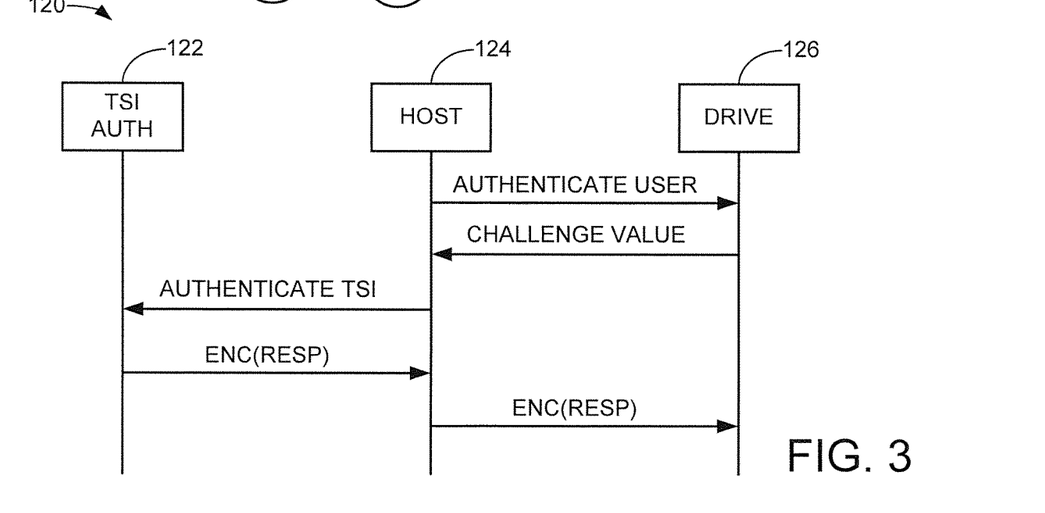
FIG. 3 is a sequence diagram illustrating an authentication transaction carried out using a remote trusted server in some embodiments.

FIG. 3 is a sequence diagram 120 illustrating a remote authentication sequence that may be carried out by aspects of the network 110 in accordance with some embodiments. A trusted security infrastructure (TSI) 122, also sometimes referred to as the TSI authority or the TSI authority circuit, is a logical entity comprised of hardware and/or software designated to handle certain functions within the protection scheme. The TSI authority 122 may be a separate server dedicated to this purpose, or may be managed and distributed as required among various nodes by authorized system administrators (administrative users). The TSI authority 122 may form a portion of a remote security (key) management system in which system authentication techniques, including the transfer of encryption keys, certificates or other authentication data are passed to provide access to the system. The TSI authority communicates to a device using a selected security protocol.

A host 124 and a drive 126 (e.g., an SSD) are arranged to communicate with the TSI authority 122. In this example, the host 124 initiates a sequence to gain authorized access a protected security aspect of the drive 126. In order to do so, sufficient trust must be established between the TSI authority 122, the host 124 and the drive 126. To authenticate each of these entities to the others, the host 124 may initiate the process such as by requesting an encrypted challenge string from the drive 126. The host may supply an initial value which is encrypted by the drive, or some other sequence may be employed. The challenge value may be forwarded to the TSI Authority 122, which processes the challenge value in some way to provide an encrypted response, which may be processed by the host and the drive.

Once all entities are satisfied, the host proceeds with the requested transaction. Examples that may involve requested transactions may include normal data accesses including accesses to secured volumes, etc. Diagnostic functions may also be enacted such as installing new firmware, performing specific security actions such as secure erasure, drive unlock, enablement of serial ports, etc. Many such inter-entity sequences are known in the art, and substantially any suitable sequence can be used as desired.

While operable, the centralized system 120 of FIG. 3 is not always suitable for certain types of authentication processing. One such example is provided in FIG. 4 which shows a local processing group 130 constructed in accordance with some embodiments.

Figure 4:
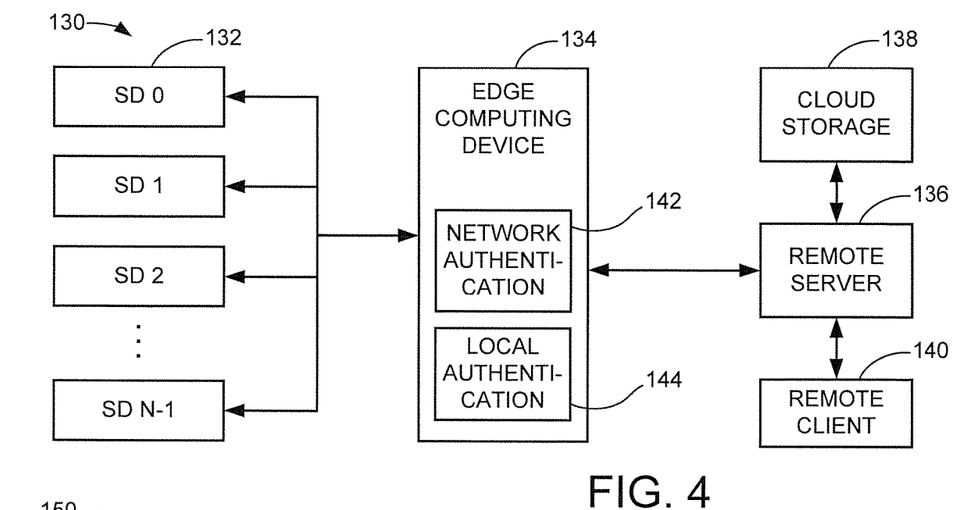
FIG. 4 is a functional block diagram of a trust group having a host and a collection of processing devices in accordance with some embodiments.

The group 130 is exemplified as a local storage node of the network 110 of FIG. 2. In some embodiments, the group 130 is a collection of local data storage devices (e.g., SSDs) 132 physically disposed within an enclosure, rack or other arrangement to provide local mass storage for an end user, such as in a private cloud environment. Other forms of local devices can be used, however, such as but not limited to a collection of IoT (Internet of Things) devices that cooperate to provide data generation, processing and/or storage in a particular location.

The storage devices 132 are coupled to a host 134. The host 134, also referred to as an edge computing device or simply an edge, comprises an edge server or other processing device that controls the local devices 132 and performs edge of cloud processing operations.

The edge communicates across a network to a remote server 136, which may comprise a cloud server with associated cloud storage 138. The cloud storage 138 may take a form similar to the storage node formed by the group 130, or may take some other form. Local data collected, stored and/or processed by the group 130 may be updated for storage by the cloud storage node 138 as well.

A remote client 140 represents a user device used by a selected user to access the various devices in the system, including the storage and retrieval of data to and from the local devices 132. Of particular interest are a network authentication block 142 and a local authentication block 144 of the edge 134. As explained below, these blocks represent hardware and/or programmable processor circuitry that operate to authenticate aspects of the system for the selected user.

The number N of local devices 132 can vary widely depending on the requirements of a given application, from values as low as 2-3 to values of several hundred or more. A suitable range for many applications may be around 5-20 devices, although families of up to 200-300 or more may be useful for some environments. Groups of the devices 132 may be arranged into sub-collections to expedite authentication processing. The devices may be arranged in one or more storage enclosures.

For local groups such as 130, it may not be suitable or feasible to undergo remote authentication of each of the storage devices 132 in the collection in the manner set forth by FIG. 3 each time that the storage devices are initialized and brought online for operation. At the same time, failure to perform authentication at the device level could potentially provide an attacker with an opportunity to breach the system using a direct or side-channel attack upon the devices or local host.

Figure 5:
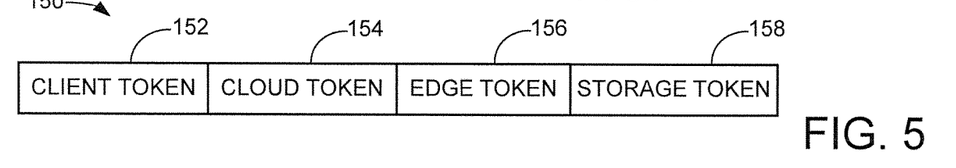
FIG. 5 shows a sequence of tokens used by the system of FIG. 4 in some embodiments.

Accordingly, the system in FIG. 4 uses a distributed token strategy to authenticate the chain of devices from the remote client device down to the local storage devices. To this end, FIG. 5 shows an exemplary format for a token system 150. The token system 150 includes a client token 152, a cloud token 154, an edge token 156 and a (set of) storage tokens 158. Each of these may be derivative of the client token 152, in that the cloud, edge and storage tokens may be derived, serially and/or in parallel, from the client token. Further details regarding the particular form and use of the tokens will be discussed below.

Figure 6:
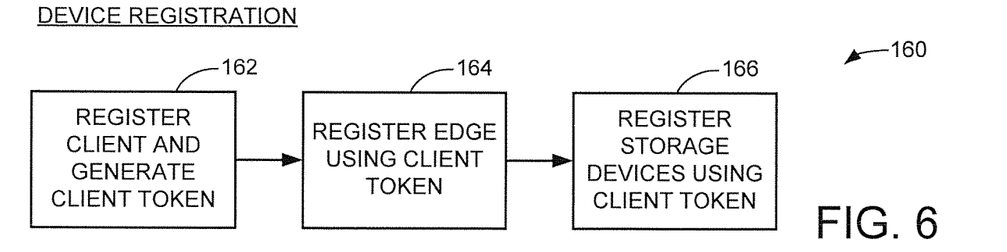
FIG. 6 is a sequence diagram for a device registration operation in some embodiments.
Figure 7:
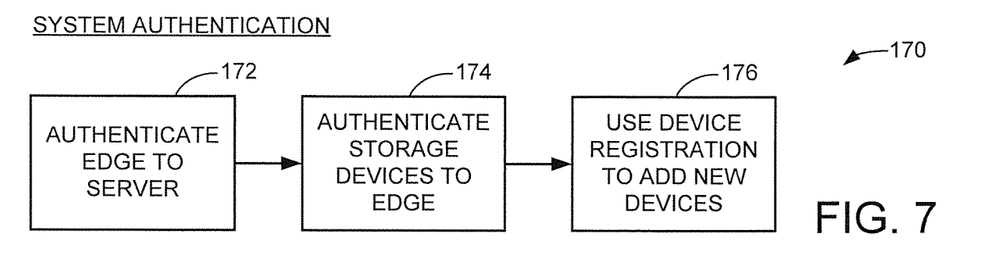
FIG. 7 is a sequence diagram for a system authentication operation in some embodiments.

FIGS. 6 and 7 show respective device registration and system authentication sequences 160, 170 that may be carried out by the system of FIG. 4 in accordance with some embodiments. The device registration sequence 160 is carried out initially to register the various components of the system. Once registered, the system authentication sequence 170 is carried out each time the system is initialized or otherwise requires authentication to enable normal operation in a trusted manner. As explained below, the detection of new devices that have been added to the system will require at least aspects of the device registration sequence 160 to be carried out for the new devices.

As shown by FIG. 6, the device registration sequence 160 includes an operation at block 162 to register the client device (e.g., client 140). This adds a new user to the system. This sequence includes the generation of the client token 152 from FIG. 5. Block 164 represents the registration of the edge device (e.g., host 134) to the system with respect to the new user from block 162. This registration results in the generation of the edge token 156, which is based on the client token 152. Block 166 represents the registration of the local devices (e.g., storage devices 132), and the generation and distribution of individual storage tokens 158 for the storage devices. Each of these registration processes may be carried out using the trusted server approach discussed above in FIG. 3.

As shown by FIG. 7, once registered the system is authenticated beginning at block 172 where an upstream authentication takes place so that the edge device (e.g. host 134) is authenticated to the network portions of the system. At block 174, a downstream authentication takes place so that the edge device authenticates the local group of storage devices 132. These can be carried out in any desired order, but it will be noted that the edge device is the center of the authentication processing. Finally, block 176 shows that, to the extent that any new devices are detected such as during blocks 172, 174, the registration sequence 160 is invoked and completed prior to final system authentication.

Figure 8A:
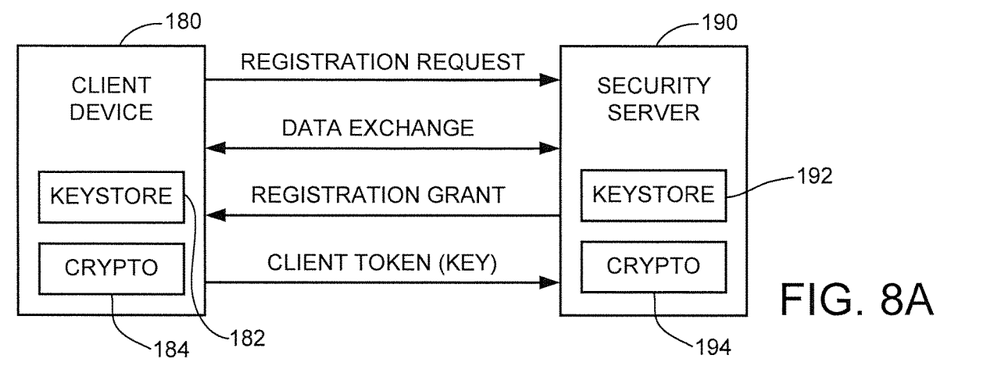
FIGS. 8A through 8C show aspects of the sequence diagram of FIG. 6 in some embodiments.
Figure 8B:
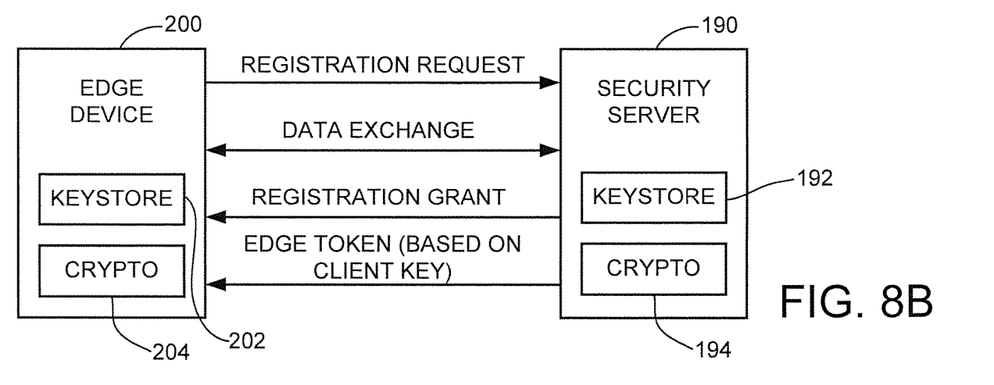
Figure 8C:
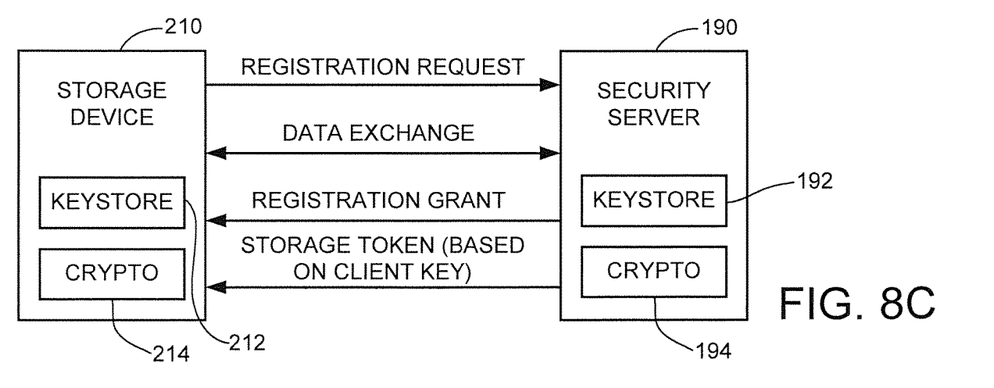

FIGS. 8A through 8C are functional block depictions of various devices to illustrate aspects of the device registration sequence 160 of FIG. 6. In. FIG. 8A, a client device 180 is coupled to a security server 190. The client device 180 may be similar to the user client device 140 and includes various local capabilities such as a programmable processor, memory, programming, applications, etc. Of interest are a keystore 182 and a crypto block 184. The keystore 182 provides local secure memory, such as embedded memory within a SOC (system on chip) integrated circuit device, in which various control information can be safely stored in a trusted manner. The crypto block 184 represents hardware/ firmware programming capabilities to carry out various cryptographic operations as required during the registration process.

The security server 190 may generally correspond to the remote server 136 or some other trusted server such as discussed in FIG. 3. The security server may be associated with the manufacturer of one or more of the components of the system, such as the storage devices, the edge processor, etc. A trusted authentication process is carried out using the security server 190. The security server may include associated keystore and crypto blocks 192, 194.

As shown in FIG. 8A, the registration process (see block 162) may include the issuance of a registration request from the client device 180. A series of data exchanges take place between the client device and the security server in response to this request. As discussed above in FIG. 3, these data exchanges can take a number of forms, including the issuance of one or more challenge values, random sequences, public keys, hashes, etc. that are respectively processed, used or otherwise evaluated by each of the client device and the security server in order to establish a trust boundary between the respective devices. Internally stored and otherwise inaccessible encryption keys or other values may be used as part of this authentication process.

As part of a successful registration process, a client token (key), such as the token 152 in FIG. 5, is generated and stored. The client token is a unique identifier value used by the user of the client device, and may include the concatenation or otherwise inclusion of various types of data associated with the user and/or client device. Biometrics, passwords, secret keys, passcodes, etc. may be included within the client token. It is contemplated that the client token will be securely stored by both the client device and the security server 180, 190 in the respective keystones 182, 192. The respective crypto blocks 192, 194 may be used during the registration process as well as during the generation of the client token.

FIG. 8B shows a registration process for an edge device 200, which may generally correspond to the host (edge) 134 in FIG. 4 and the processing of block 164 in FIG. 6. The edge device 200 may include a local edge device keystore 202 and crypto block 204. A similar exchange takes place as described above between the edge device and the security server 190. At the conclusion of a successful registration sequence, an edge token is generated and stored by both the edge device and, as required, the security server. The edge token uniquely identifies the edge device 200 to the system, and incorporates at least a portion of the client token. In some cases, the edge device will already be registered to the system for other purposes, so it will be understood in such cases that the registration operation is with respect to the specific user of the client device. Thus, particular bands, namespaces, zones, applications authorized for use by the user can be unlocked and accessed at the edge device level based on the registration operation of FIG. 8B.

FIG. 8C shows registration of a storage device 210 as set forth by block 166 in FIG. 6. The process is repeated for each of the local storage devices in the system (see, e.g., FIG. 4). The storage device 210 includes a keystore 212 and crypto block 214. As before, each local storage device 210 performs a data exchange to obtain a registration grant and a local storage token. The local storage token is unique to the storage device and, as before, is based on the client token. As with the edge token, additional local identifying information may be incorporated into the storage token as well.

Figure 9A:
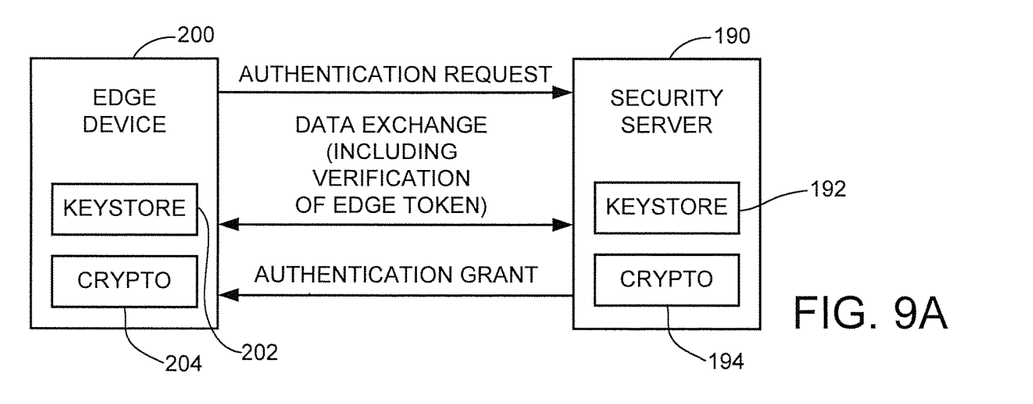
FIGS. 9A and 9B show aspects of the sequence diagram of FIG. 7 in some embodiments.
Figure 9B:
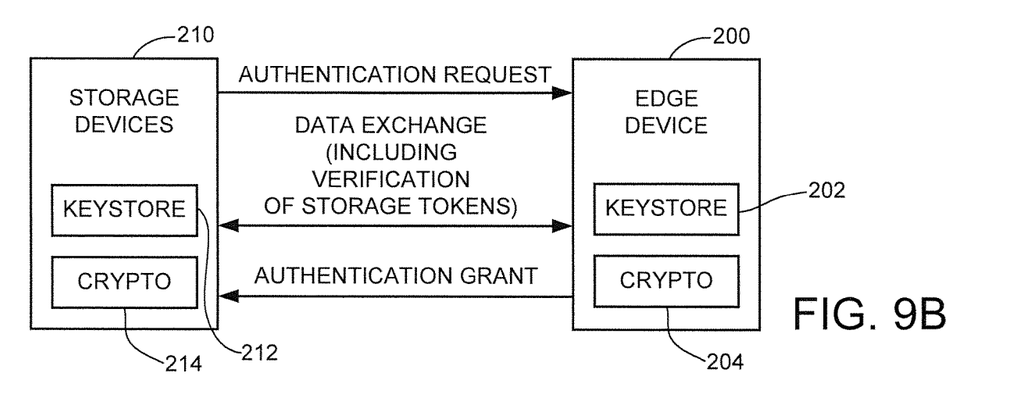

FIGS. 9A and 9B show system authentication in accordance with the sequence 170 of FIG. 7. In FIG. 9A, upstream authentication takes place between the edge device 200 and the security server 190. The sequence may be similar to, or different from, the registration process of FIG. 8B. It is contemplated that an aspect of the authentication process will include the transfer of data processed using the edge token. This can reduce the time and resources required to complete the authentication processing operation. Moreover, because the authentication process incorporates use of the edge token (which is based on the client token), the user can be assured that the edge device is trustworthy based on successful authentication.

In FIG. 9B, local downstream authentication takes place between the edge device 200 and each of the local storage devices 210. Instead of requiring transfers of data across the network, the authentication is carried out locally among these respective devices. As before, the storage tokens are used as part of the authentication processing. In this way, the user can be assured that the local storage devices are trustworthy based on successful authentication.

Figure 10A:
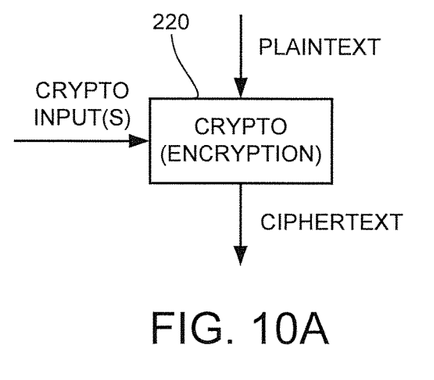
FIGS. 10A and 10B show different configurations of the crypto blocks set forth in FIGS. 8A through 9B in some embodiments.
Figure 10B:
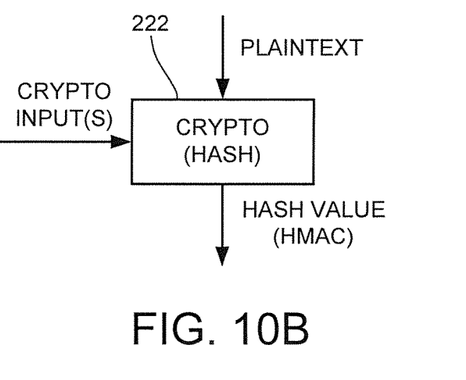

FIGS. 10A and 10B show different forms of crypto blocks that may be incorporated by the various client, server, edge and storage devices discussed above. FIG. 10A shows a crypto block 220 characterized as an encryption/decryption block. In this case, input plaintext data are modified using a suitable encryption function based on various crypto inputs (such as an encryption key, token, seed value, counter value, etc.) to generate output ciphertext. If a symmetric encryption function is applied, then presentation of the ciphertext hack as the input and the same crypto inputs will return the originally generated plaintext. It is contemplated that the various tokens disclosed herein can be used not only during the authentication process, but can further be used during normal data transfer operations, such as via the encryption/decryption of user data, etc. It will be appreciated that the reference to plaintext can include previously generated ciphertext using an upstream encryption process.

FIG. 10B shows another crypto block 222 that can be used in some embodiments by the various devices. The crypto block 222 is characterized as a hash block which applies a suitable hash function (e.g., a secure hash algorithm, SHA) using input plaintext and, as required, various crypto inputs to generate an output hash value (hash-based message authentication code, HMAC). While not transforming the plaintext as in FIG. 10A, the hash block 222 can advantageously use a crypto input, such as one or more of the tokens discussed above, as a value to generate a corresponding hash value that can be transferred or stored with the plaintext data to assure that no tampering has occurred with the plaintext data.

Figure 11:
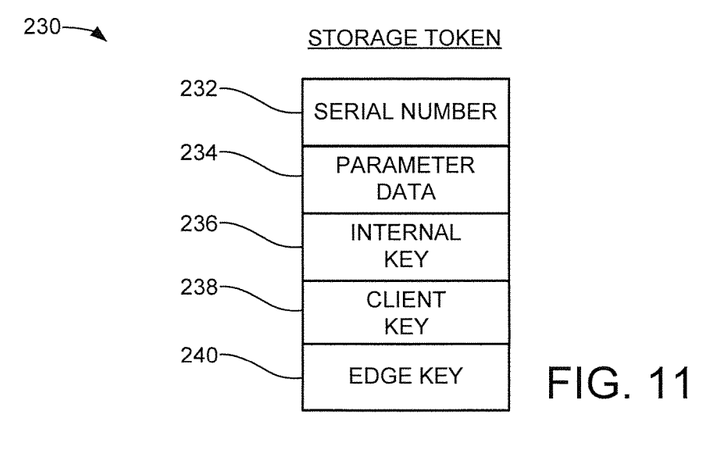
FIG. 11 is an exemplary format for a storage token used during authentication of the storage devices in some embodiments.

FIG. 11 shows an exemplary storage token 230 used by the storage device 210 during local authentication in some embodiments. Other formats can be used so FIG. 11 is merely for illustration and is not limiting. The storage token can include various information including a local serial number 232, parameter data 234 associated with the storage device, an internal key 236 or other internally stored data, a client key 238 and an edge key 240. The client and edge keys may correspond to the client and edge tokens discussed above, portions thereof, or some other aspect of the system. It will be appreciated that the storage token uniquely identifies the storage device and is based on the client token from the user.

Figure 12:
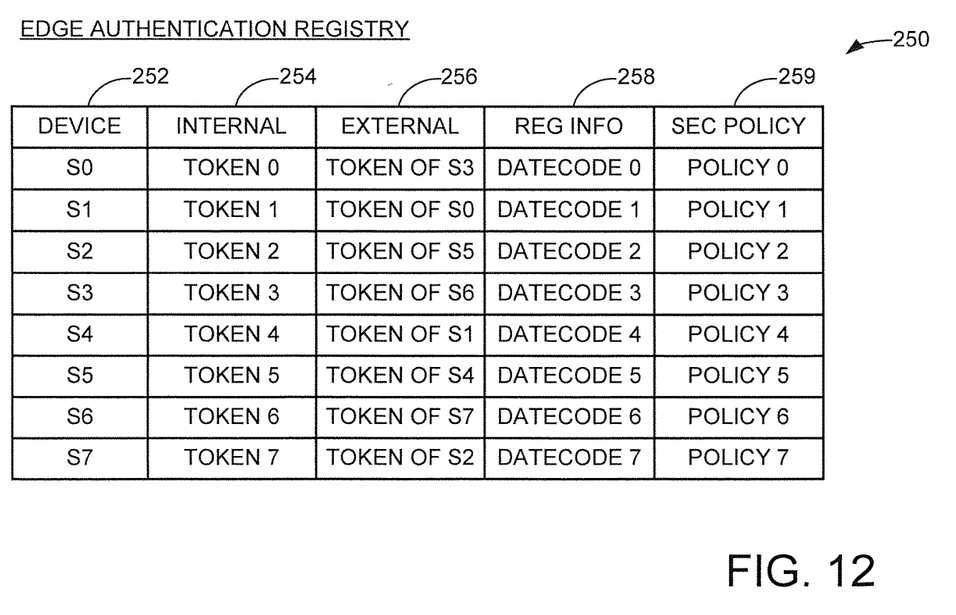
FIG. 12 is an exemplary format for an edge authentication registry table used during authentication of the storage devices in some embodiments.

FIG. 12 shows a format for an edge authentication registry table 250 stored and used by the edge device 200 in some embodiments. As before, the format of the table is merely for purposes of illustration and is not limiting. It is contemplated that the table is maintained as a data structure in memory (e.g., the edge keystore 202, etc.) and used during the local authentication of the devices 210.

As shown in the example of FIG. 12, the table 250 represents an accumulation of authentication information associated with the local devices 200. A first column 252 identifies the storage devices in the collection. In this example, there are a total of each (8) such members, identified as S0 through S7. Column 254 identifies the respective internal tokens for the collection members, identified as Token 0 through Token 7. These tokens may be the same as what are stored in the keystores of the individual devices, or may be in a cryptographically protected form (e.g., encrypted, etc.).

Column 256 shows the external token associations among the various members; for example, device S0 stores the external token for device S3, and so on. Column 258 shows registration information (Datecode 0 to Datecode 7) associated with each of the collection members. The registration information can take a variety of forms and may include date/time information relating to when each device was added to the collection, the authentication authority that was used to authorize the addition of the member to the collection, and so on. Column 259 shows security policy information (Policy 0 to Policy 7) relating to various restrictions or other policies set for the accessing of each collection member. Other formats and types of data may be included in the table 250 as well, including configuration information, users, namespaces, etc.

The table 250 can be protected through the application of encryption, hashing, the use of a blockchain, etc. using crypto blocks such as illustrated in FIGS. 10A-10B. A blockchain hashes together previous versions (blocks or ledgers) of the tables. This allows the system to retain history data with respect to the configuration of the group in a tamper-proof manner.

While not necessarily required, it will be noted that each storage device in the table 250 stores not only its own storage token (referred to as an internal token), but also stores the storage token of at least one other storage device in the local group (referred to as an external token). This allows the edge device 200 to request the tokens from the various storage devices, and account for the presence of all of the internal tokens as well as all of the external tokens, thus making it more difficult for an unauthorized storage device to spoof its presence as authorized. As desired, a copy of the table 250 can additionally be stored in each storage device (or a subset thereof), so that the table is retrieved from the storage device(s) as part of the authentication processing.

Figures 13A, 13B, 14:
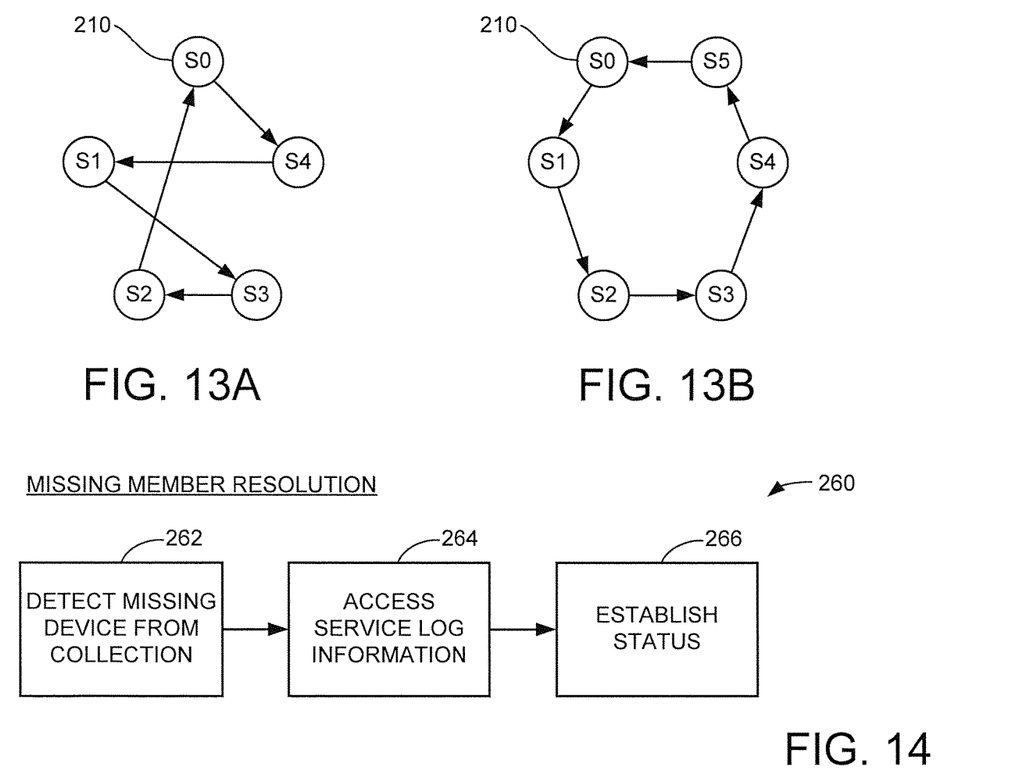
FIGS. 13A and 13B show different associations of storage devices within the collection of FIG. 4 in various embodiments.
FIG. 14 is a sequence diagram for a missing member resolution operation in some embodiments.

FIGS. 13A and 13B show different ways in which the external tokens can be distributed among a set of storage devices S0 through S4. FIG. 13A shows a random distribution of the external tokens, while FIG. 13B shows a round-robin distribution of the external tokens. It will be noted that the tokens can be required in order for all of the storage devices to operate; removing a selected storage device from the group and separately attempting to access FIG. 14 shows a missing member resolution sequence 260 that may be carried out as part of the edge level local authentication of FIGS. 7 and 9A-9B. Block 262 detects at least one missing device. This may be a result of one or more storage tokens from the table 250 not being accounted for during the polling by the edge device 200. As a result, the edge device 200 can proceed at block 264 to access service log or other information associated with the group. For example, it is possible that the missing device was due to a failure event associated with the device, which may or may not yet have been addressed such as by the switching in of a spare, etc. Other causes for a missing device may exist as well such as the missing device not being powered up, having lost an interface connection, etc.

Presumably, the successful replacement of an existing device would result in a new registration and authentication sequence so that the table 250 is up-to-date with the new information for the configuration of the system, but to the extent that a missing device is detected, investigation can take place prior to completing the local authentication. A final status of the system can be established at block 266.

It is contemplated in a mass-storage environment that all of the devices in the collection will be powered up and down concurrently, such as by being supplied with a common power supply circuit. In such case, a missing device may indicate that a device failure condition has occurred, or that a device may have been removed from the system (either by an authorized entity or not). In other environments, however, the various devices in the collection (such as an IoT application) the devices may be powered up independently, so that different members of the various devices may come online at different times. In this case, the authentication routine may operate to locate all valid devices that are currently responsive to inputs from the edge device. A system log report may be generated and to indicate the then available devices in the collection.

Figure 15:
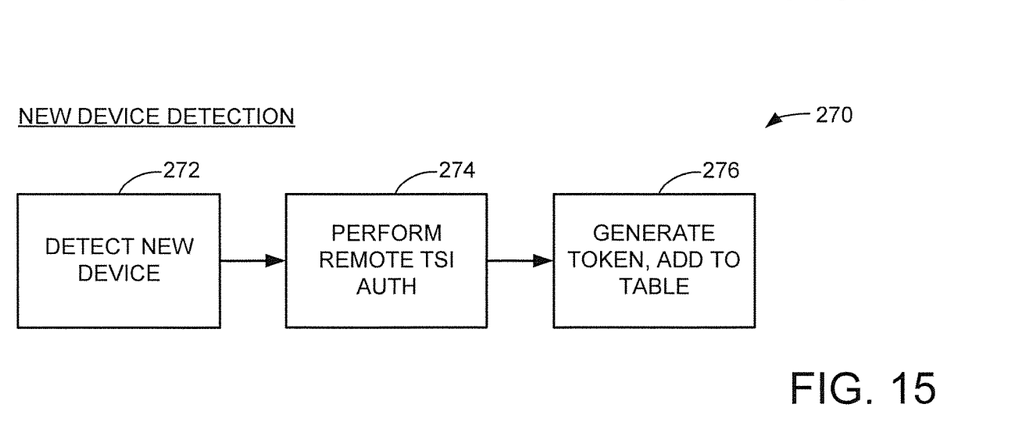
FIG. 15 shows a sequence diagram for a new device detection operation in further embodiments.

FIG. 15 provides a new device detection sequence 270 illustrative of steps that may arise during the local authentication of the storage devices 210 in further embodiments. Block 272 indicates that the edge device 200 has located an additional, new device 210 within the group. In this case, all of the storage tokens were accounted for among the expected number of storage devices, but one or more additional storage devices (or other forms of devices) are present in the system. In this case, the flow passes to block 274 where a remote registration process is carried out with a remote security server (such as 190), after which the new device is added to the system, block 276.

A variety of token distribution strategies can be used when adding a new device to an existing collection. If the new device replaces a failed member that is no longer present in the group, the new device can simply store the external token that was held by the failed member, and the external token of the new device can be distributed to the other member that previously stored the external token for the failed member.

If the new device has been added to expand the size of the family, it may be more appropriate for the host device to form a new association pattern for all of the tokens among all of the collection members. It is further possible for the host device to form new association patterns periodically among the collection of devices as well. In one embodiment, after each successful authentication cycle, the host distributes new tokens among the various collection members so that a different association is used for the next authentication cycle that is performed.

As noted above, it is contemplated that the various collection members will be located in the same general geographical location, so that the host and member devices are sufficiently near one another to share a common geoposition such as in a multi-device storage enclosure, a rack, a data center, etc. It is possible, however, to geographically distribute the members of group, with communication between the host and the devices carried out using one or more networks to provide the local authentication described herein. Smaller sub-collections can perform the local authentication processing, after which multiple sub-collections may be treated as individual members in a larger network of nodes (extended collection) in a distributed system.

Figure 16:
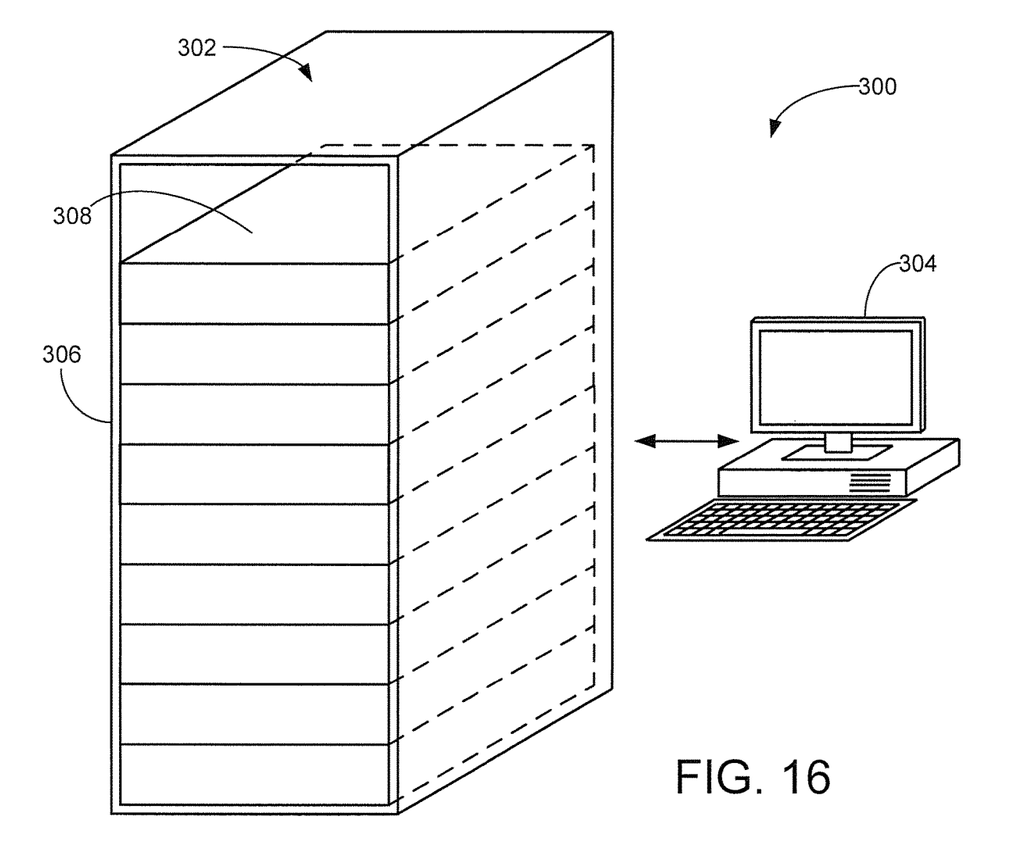
FIG. 16 is a schematic representation for a multi-device storage system in accordance with further embodiments.

FIG. 16 provides a schematic depiction of a data storage system 300 in which various embodiments of the present disclosure may be advantageously practiced. The data storage system 300 is a mass-data storage system in which a large population of data storage devices are incorporated into a larger data storage space to provide a storage node as part of a larger geographically distributed network. Examples include a cloud computing environment, a network attached storage (NAS) application, a RAID (redundant array of independent discs) storage server, etc.

The system 300 includes a storage assembly 302 and a computer 304 (e.g., server controller, etc.). The storage assembly 302 may include one or more server cabinets (racks) 306 with a plurality of modular storage enclosures 308. While not limiting, the storage rack 306 is a 42 U server cabinet with 42 units (U) of storage, with each unit extending about 1.75 inches (in) of height. The width and length dimensions of the cabinet can vary but common values may be on the order of about 24 in.×36 in. Each storage enclosure 308 can have a height that is a multiple of the storage units, such as 2 U (3.5 in.), 3 U (5.25 in.), etc. to accommodate a desired number of adjacent storage devices 134. While shown as a separate module, the computer 304 can also be incorporated into the rack 306. In some embodiments, the computer 304 can operate as the edge devices 134, 200 discussed above.

Figure 17:
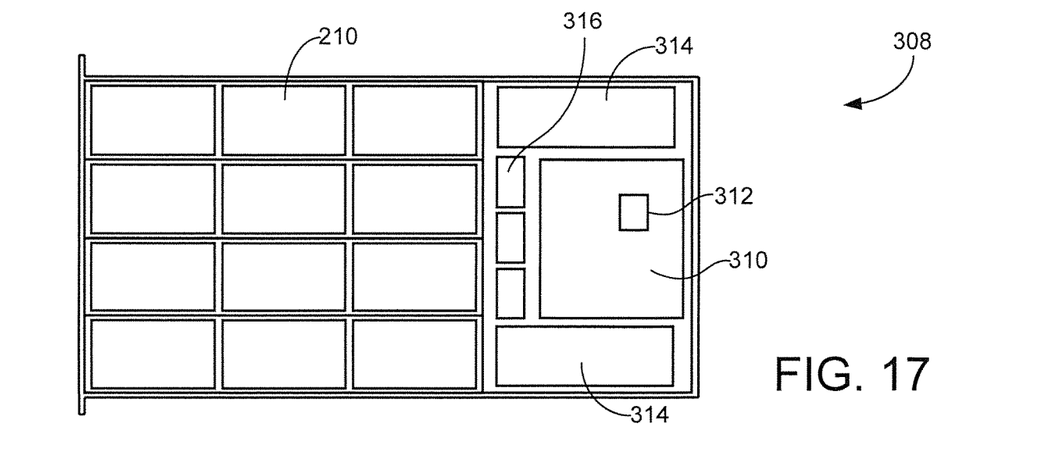
FIG. 17 shows a storage enclosure from FIG. 16 in some embodiments.

FIG. 17 is a top plan view of a selected storage enclosure 308 that incorporates 36 (3×4×3) data storage devices 210. Other numbers and arrangements of data storage devices can be incorporated into each enclosure, including different types of devices (e.g., HDDs, SDDs, etc.). The storage enclosure 308 includes a number of active elements to support the operation of the various storage devices, such as a controller circuit board 310 with one or more processors 312, power supplies 314 and cooling fans 316.

The modular nature of the various storage enclosures 308 permits removal and installation of each storage enclosure into the storage rack 306 including under conditions where the storage devices in the remaining storage enclosures within the rack are maintained in an operational condition. In some cases, the storage enclosures 308 may be configured with access panels or other features along the outwardly facing surfaces to permit individual storage devices, or groups of devices, to be removed and replaced. Sliding trays, removable carriers and other mechanisms can be utilized to allow authorized agents to access the interior of the storage enclosures as required.

All of the storage devices in the storage enclosure 308 can be incorporated into a collection. In the example of FIG. 16, this would provide a trust family with 36 storage devices. The trust family host functions can be executed by the processors 312 on the storage enclosure control board 310. Each time the storage enclosure 308 is activated, and at other suitable times, the authentication processing of FIG. 7 can be carried out to quickly validate the integrity of the enclosure devices.

In further embodiments, sets of devices within the storage enclosure 308 can be established as separate collections, or collections can be arranged to span multiple storage enclosures, including all of the enclosures in the rack 302.

It will now be appreciated that the various embodiments discussed herein can provide a number of benefits. Promoting localized authentication to the edge as exemplified herein can provide fast and efficient validation of collection members with a high level of trust. While various embodiments have contemplated an illustrative environment that uses a group of storage devices such as SSDs, it will be appreciated that the various examples are not so limited and that the various processing herein can be applied to any number of different groups and types of processing devices, such as computing devices, communication devices, sensing devices, etc. that utilize security measures to provide and govern security access.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. A system comprising:
a plurality of processing devices arranged as a collection, each processing device storing a storage token comprising a unique ID value associated with the corresponding processing device; and
an edge computing device coupled between the plurality of processing devices and an external network, the edge computing device configured to perform a network authentication of the edge computing device over the external network with a remote server using an edge token, and to perform a local authentication of the collection using the storage tokens of the respective processing devices, the local authentication not utilizing the external network or the remote server, and the local authentication comprising bidirectional communication of information between the edge device and the collection of processing devices without utilizing the external network.

2. The system of claim 1, wherein the network authentication of the edge computing device comprises a data exchange across the external network with the remote server, and wherein the local authentication of the collection does not include a data exchange across the external network with the remote server.

3. The system of claim 1, wherein both the edge token and the storage tokens incorporate at least a portion of a client token associated with a client device.

4. The system of claim 1, wherein the edge token and the storage tokens are respectively generated during a registration process with the remote server from a client token associated with a user of the client device, the client device coupled to the processing devices via the edge computing device and the external network.

5. The system of claim 1, wherein the edge computing device performs the local authentication of the collection by accessing a table as a data structure in a keystore memory that associates the storage tokens with the respective processing devices.

6. The system of claim 1, wherein the storage token stored by each of the processing devices is characterized as an internal token, and wherein each processing device further stores an external token comprising the internal token of a different one of the processing devices in the collection.

7. The system of claim 6, wherein the edge computing device performs the local authentication by retrieving each of the internal and external tokens from each of the processing devices.

8. The system of claim 1, wherein the edge computing device is further configured to add a new processing device to the collection responsive to detecting the new processing device during the local authentication, the edge computing device authenticating the new processing device via communications, over the external network, with the remote server, the edge computing device further operating to transfer a new storage token to the new processing device for storage thereby.

9. The system of claim 1, wherein the edge computing device locally authenticates the collection by forwarding a first query to each of the processing devices, and evaluating a corresponding response from each of the processing devices generated using the storage token associated with each of the processing devices.

10. The system of claim 1, wherein the processing devices comprise data storage devices each having a data storage device controller circuit and a non-volatile memory (NVM) to store user data supplied by the edge computing device.

11. The system of claim 1, wherein the edge computing device comprises a crypto circuit that applies a cryptographic function to cryptographically protect the storage tokens and the edge token in a keystore memory of the edge computing device.

12. A method comprising:
registering, via an external network, each of an edge computing device and a plurality of local processing devices with a remote server, the edge computing device coupled between the local processing devices and the external network;
performing a network authentication of the registered edge computing device via the external network using an edge token generated during the registration of the edge computing device; and
performing a local authentication of the local processing devices by the edge computing device without accessing the external network, the local authentication using unique storage tokens associated with the respective local processing devices and generated during the registration of the local processing devices, and the local authentication comprisin bidirectional communication of information between the edge device and the plurality of local processing devices without utilizing the external network.

13. The method of claim 12, wherein the edge token and each of the storage tokens are generated responsive to a client token associated with a client device configured to interact with data associated with the local processing devices.

14. The method of claim 13, wherein the client token comprises an encryption key used to encrypt data stored by the local processing devices.

15. The method of claim 12, wherein the network authentication of the edge computing device comprises a data exchange across the external network with the remote server, and wherein the local authentication of the collection does not include a data exchange across the external network.

16. The method of claim 12, wherein the edge computing device performs the local authentication of the collection by accessing a table as a data structure in a keystore memory that associates the storage tokens with the respective processing devices.

17. The method of claim 12, wherein the storage token stored by each of the processing devices is characterized as an internal token, wherein each processing device further stores an external token comprising the internal token of a different one of the processing devices in the collection, and wherein the edge computing device performs the local authentication by retrieving each of the internal and external tokens from each of the processing devices and comparing the retrieved internal and external tokens to a table as a data structure in a keystore memory of the edge computing device.

18. The method of claim 12, wherein each of the local processing devices is characterized as a solid-state drive (SSD) comprising NAND flash memory.

19. A storage device, comprising:
a non-volatile memory (NVM);
a keystore memory; and
a controller circuit configured to store a storage token in the keystore memory responsive to a registration process in which the controller circuit communicates, via an external network, with a remote server to register the storage device with a selected client, the controller circuit further configured to use the storage token responsive to a subsequent local authentication process with an edge computing device coupled between the storage device and the external network to authenticate the edge computing device as being authorized by the selected client, the controller configured to send information to, and receive information from, the edge device as part of the local authentication process without utilizing the external network.

20. The storage device of claim 19, wherein the keystore memory stores the storage token and at least one additional storage token associated with an adjacent storage device coupled to the edge computing device, wherein the at least one additional storage token is further used during the local authentication process to establish a trust boundary that includes the storage device, the at least one additional storage device, and the edge computing device.

* * * * *

UNITED STATES PATENT AND TRADEMARK OFFICE
CERTIFICATE OF CORRECTION

| | | |
|---|---|---|
| PATENT NO. | : 11,595,369 B2 | |
| APPLICATION NO. | : 16/677726 | |
| DATED | : February 28, 2023 | |
| INVENTOR(S) | : Christopher Nicholas Allo | |

It is certified that error appears in the above-identified patent and that said Letters Patent is hereby corrected as shown below:

In the Claims

Column 13, Claim 12, Line 41, please replace the word "cornprisin" with the word --comprising--.

Signed and Sealed this
Twentieth Day of February, 2024

*Katherine Kelly Vidal*

Katherine Kelly Vidal
*Director of the United States Patent and Trademark Office*